(12) United States Patent
Choi et al.

(10) Patent No.: US 11,920,286 B2
(45) Date of Patent: Mar. 5, 2024

(54) CLOTHES TREATMENT APPARATUS

(71) Applicant: LG ELECTRONICS INC., Seoul (KR)

(72) Inventors: Junyoung Choi, Seoul (KR); Wansik Nam, Seoul (KR); Sunghoo Park, Seoul (KR); Hyeyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 606 days.

(21) Appl. No.: 17/262,420

(22) PCT Filed: Jul. 30, 2019

(86) PCT No.: PCT/KR2019/009478
§ 371 (c)(1),
(2) Date: Sep. 2, 2021

(87) PCT Pub. No.: WO2020/027543
PCT Pub. Date: Feb. 6, 2020

(65) Prior Publication Data
US 2021/0395933 A1    Dec. 23, 2021

Related U.S. Application Data (60) Provisional application No. 62/711,629, filed on Jul. 30, 2018.

(51) Int. Cl.
*D06F 58/10* (2006.01)
*B29C 44/14* (2006.01)
(Continued)

(52) U.S. Cl.
CPC ............ *D06F 58/10* (2013.01); *B29C 44/14* (2013.01); *B29C 44/18* (2013.01); *B29C 44/38* (2013.01);
(Continued)

(58) Field of Classification Search
CPC ...................................................... D06F 58/10
See application file for complete search history.

(56) References Cited

U.S. PATENT DOCUMENTS 3,323,224 A    6/1967 Lough et al.
3,672,188 A    6/1972 Geschka et al.
(Continued)

FOREIGN PATENT DOCUMENTS

CN    1055335 A    10/1991
CN    1170061 A    1/1998
(Continued)

OTHER PUBLICATIONS

Russian Notice of Allowance issued in Russian Application No. 2021103321, dated Jul. 5, 2021 (7 pages).
(Continued)

*Primary Examiner* — Jason Y Ko
(74) *Attorney, Agent, or Firm* — Birch, Stewart, Kolasch & Birch, LLP (57) ABSTRACT

The present disclosure relates to a clothes treatment apparatus comprising: an outer case having a first opening of which the front is open; an inner case provided inside the outer case; a machine room forming part positioned at the lower part of the inner case so as to form a machine room separated from the inner case; a foaming space formed between the outer case and the machine room forming part; foamed plastics filled in the foaming space; and strength reinforcing parts positioned at both side surfaces of the outer case in the foaming space so as to reinforce the strength of the outer case.

12 Claims, 7 Drawing Sheets

(51) Int. Cl.

| | |
|---|---|
| *B29C 44/18* | (2006.01) |
| *B29C 44/38* | (2006.01) |
| *D06F 34/28* | (2020.01) |
| *D06F 34/34* | (2020.01) |
| *D06F 35/00* | (2006.01) |
| *D06F 39/00* | (2020.01) |
| *D06F 39/12* | (2006.01) |
| *D06F 39/14* | (2006.01) |
| *D06F 58/12* | (2006.01) |
| *D06F 58/20* | (2006.01) |
| *D06F 58/24* | (2006.01) |
| *D06F 58/26* | (2006.01) |
| *D06F 73/02* | (2006.01) |
| *D06F 87/00* | (2006.01) |
| *B29K 23/00* | (2006.01) |
| *B29K 25/00* | (2006.01) |
| *B29K 75/00* | (2006.01) |
| *B29L 31/00* | (2006.01) |

(52) U.S. Cl.
CPC ............. *D06F 34/28* (2020.02); *D06F 34/34* (2020.02); *D06F 35/00* (2013.01); *D06F 39/008* (2013.01); *D06F 39/12* (2013.01); *D06F 39/14* (2013.01); *D06F 58/12* (2013.01); *D06F 58/20* (2013.01); *D06F 58/203* (2013.01); *D06F 58/24* (2013.01); *D06F 58/26* (2013.01); *D06F 73/02* (2013.01); *D06F 87/00* (2013.01); *B29K 2023/00* (2013.01); *B29K 2025/06* (2013.01); *B29K 2075/00* (2013.01); *B29K 2995/0015* (2013.01); *B29L 2031/762* (2013.01); *D06F 58/206* (2013.01)

(56) References Cited

U.S. PATENT DOCUMENTS

| | | |
|---|---|---|
| 9,107,973 B1 | 8/2015 | Robinson et al. |
| 11,236,939 B1 | 2/2022 | Harikrishnasamy |
| 2004/0000175 A1 | 1/2004 | Bolduan et al. |
| 2004/0041503 A1 | 3/2004 | Lee |
| 2009/0151193 A1 | 6/2009 | Moon et al. |
| 2009/0255141 A1 | 10/2009 | Moon et al. |
| 2010/0058813 A1 | 3/2010 | Moon et al. |
| 2010/0218566 A1 | 9/2010 | Moon et al. |
| 2011/0016930 A1 | 1/2011 | Moon et al. |
| 2011/0168217 A1 | 7/2011 | Neff et al. |
| 2012/0096734 A1 | 4/2012 | Moon et al. |
| 2012/0160269 A1 | 6/2012 | Pyo et al. |
| 2012/0235551 A1 | 9/2012 | Park et al. |
| 2012/0240425 A1 | 9/2012 | Park et al. |
| 2012/0247157 A1 | 10/2012 | Park et al. |
| 2014/0238086 A1 | 8/2014 | Choi et al. |
| 2014/0298865 A1 | 10/2014 | Park et al. |
| 2015/0020419 A1 | 1/2015 | Park et al. |
| 2015/0159315 A1 | 6/2015 | Lim et al. |
| 2016/0177500 A1 | 6/2016 | Yoon et al. |
| 2019/0120546 A1 | 4/2019 | Hong |

FOREIGN PATENT DOCUMENTS

| | | |
|---|---|---|
| CN | 2397169 Y | 9/2000 |
| CN | 1388350 A | 1/2003 |
| CN | 1456739 A | 11/2003 |
| CN | 1479066 A | 3/2004 |
| CN | 1896366 A | 1/2007 |
| CN | 101387071 A | 3/2009 |
| CN | 102016160 A | 4/2011 |
| CN | 101424037 B | 6/2011 |
| CN | 101812795 B | 8/2011 |
| CN | 102159760 A | 8/2011 |
| CN | 102388175 A | 3/2012 |
| CN | 102414361 A | 4/2012 |
| CN | 102656307 A | 9/2012 |
| CN | 102656312 A | 9/2012 |
| CN | 102679663 A | 9/2012 |
| CN | 103562458 A | 2/2014 |
| CN | 104321482 A | 1/2015 |
| CN | 104562600 A | 4/2015 |
| CN | 104846585 A | 8/2015 |
| CN | 204690363 U | 10/2015 |
| CN | 204825403 U | 12/2015 |
| CN | 205192057 U | 4/2016 |
| CN | 105714542 A | 6/2016 |
| CN | 106460301 A | 2/2017 |
| CN | 106467980 A | 3/2017 |
| CN | 206245092 U | 6/2017 |
| CN | 107142698 A | 9/2017 |
| CN | 207313967 U | 5/2018 |
| EP | 0 252 163 A1 | 1/1988 |
| EP | 0 324 589 A1 | 7/1989 |
| EP | 2523989 A1 | 11/2011 |
| EP | 2514683 A1 | 10/2012 |
| EP | 2 594 690 A1 | 5/2013 |
| EP | 2 759 632 A1 | 7/2014 |
| EP | 2883989 A1 | 6/2015 |
| EP | 3 321 414 A1 | 5/2018 |
| GB | 1 252 509 A | 11/1971 |
| GB | 2 111 142 A | 6/1983 |
| GB | 2511432 A | 9/2014 |
| JP | 48-43651 Y | 12/1973 |
| JP | 1-308597 A | 12/1989 |
| JP | 2-133787 A | 5/1990 |
| JP | 3-31273 U | 3/1991 |
| JP | 5-3876 U | 1/1993 |
| JP | 2000/225298 | 8/2000 |
| JP | 2006-506187 A | 2/2006 |
| JP | 2008-309372 A | 12/2008 |
| JP | 2009-291427 A | 12/2009 |
| JP | 2012-171 A | 1/2012 |
| JP | 2013/208248 | 10/2013 |
| JP | 2015-190716 A | 11/2015 |
| KR | 20-0206221 Y1 | 12/2000 |
| KR | 10-2009-0014444 A | 2/2009 |
| KR | 10-2009-0102402 A | 9/2009 |
| KR | 10-2009-0124147 A | 12/2009 |
| KR | 10-2010-0007342 | 1/2010 |
| KR | 10-2011-0021169 A | 3/2011 |
| KR | 10-2011-0067833 A | 6/2011 |
| KR | 10-2012-0074557 | 7/2012 |
| KR | 10-2013-0015240 A | 2/2013 |
| KR | 10-2014-0108454 A | 9/2014 |
| KR | 10-2014-0120677 | 10/2014 |
| KR | 10-2015-0007055 | 1/2015 |
| KR | 10-2015-0085728 | 7/2015 |
| KR | 10-2016-0037459 | 4/2018 |
| KR | 10-2018-0052954 A | 5/2018 |
| RU | 39604 U1 | 8/2004 |
| RU | 2467107 C1 | 11/2012 |
| RU | 2604312 C2 | 12/2016 |
| SU | 1707110 A1 | 1/1992 |
| WO | WO 2009/020328 A2 | 2/2009 |
| WO | WO 2009/064143 A3 | 5/2009 |
| WO | WO 2011/074853 | 6/2011 |
| WO | WO 2011/086076 A1 | 7/2011 |
| WO | WO 2014/108057 A1 | 7/2014 |
| WO | WO 2016/064251 | 4/2016 |

OTHER PUBLICATIONS

Indian Office Action issued in Indian Application No. 202117004656, dated Jul. 16, 2021 (7 pages).

Russian Notice of Allowance issued in Russian Application No. 2021104063, dated Aug. 10, 2021 (10 pages).

Russian Notice of Allowance issued in Russian Application No. 2021103392, dated Aug. 13, 2021 (14 pages).

Russian Notice of Allowance in Russian Application No. 2021103395, dated Aug. 13, 2021 (11 pages).

(56) References Cited

OTHER PUBLICATIONS

PCT International Search Report and Written Opinion in corresponding Application No. PCT/KR2019/009478 dated Nov. 22, 2019, 6 pages.
Notice of Allowance issued in Russian Application No. 2021104062, dated Aug. 19, 2021 (12 pages).
International Search Report and Written Opinion dated Nov. 22, 2019 in PCT/KR2019/009499 (7 pages).
International Search Report and Written Opinion dated Oct. 31, 2019 in PCT/KR2019/00500 (8 pages).
International Search Report and Written Opinion dated Oct. 31, 2019 in PCT/KR2019/009476 (6 pages).
Written Opinion of the International Searching Authority for International Patent No. PCT/KR2019/009498 dated Nov. 21, 2019 (6 pages).

CLOTHES TREATMENT APPARATUS

CROSS REFERENCES TO RELATED APPLICATIONS

This application is the National Phase of PCT International Application No. PCT/KR2019/009478, filed on Jul. 30, 2019, which claims priority under 35 U.S.C. § 119(e) to U.S. Provisional Application No. 62/711,629, filed on Jul. 30, 2018. The entire contents of the above-referenced applications are incorporated herein by reference.

BACKGROUND

Technical Field

The present disclosure relates to a laundry treating apparatus.

Background Information

In general, a laundry treating apparatus refers to an apparatus capable of performing various operations related to laundry (washing, drying, deodorization, wrinkle removal, etc.). The laundry treating apparatus is a concept including a laundry machine configured to wash laundry, a dryer configured to dry wet laundry, and a refresher configured to remove odors or wrinkles from laundry.

Figure 1:
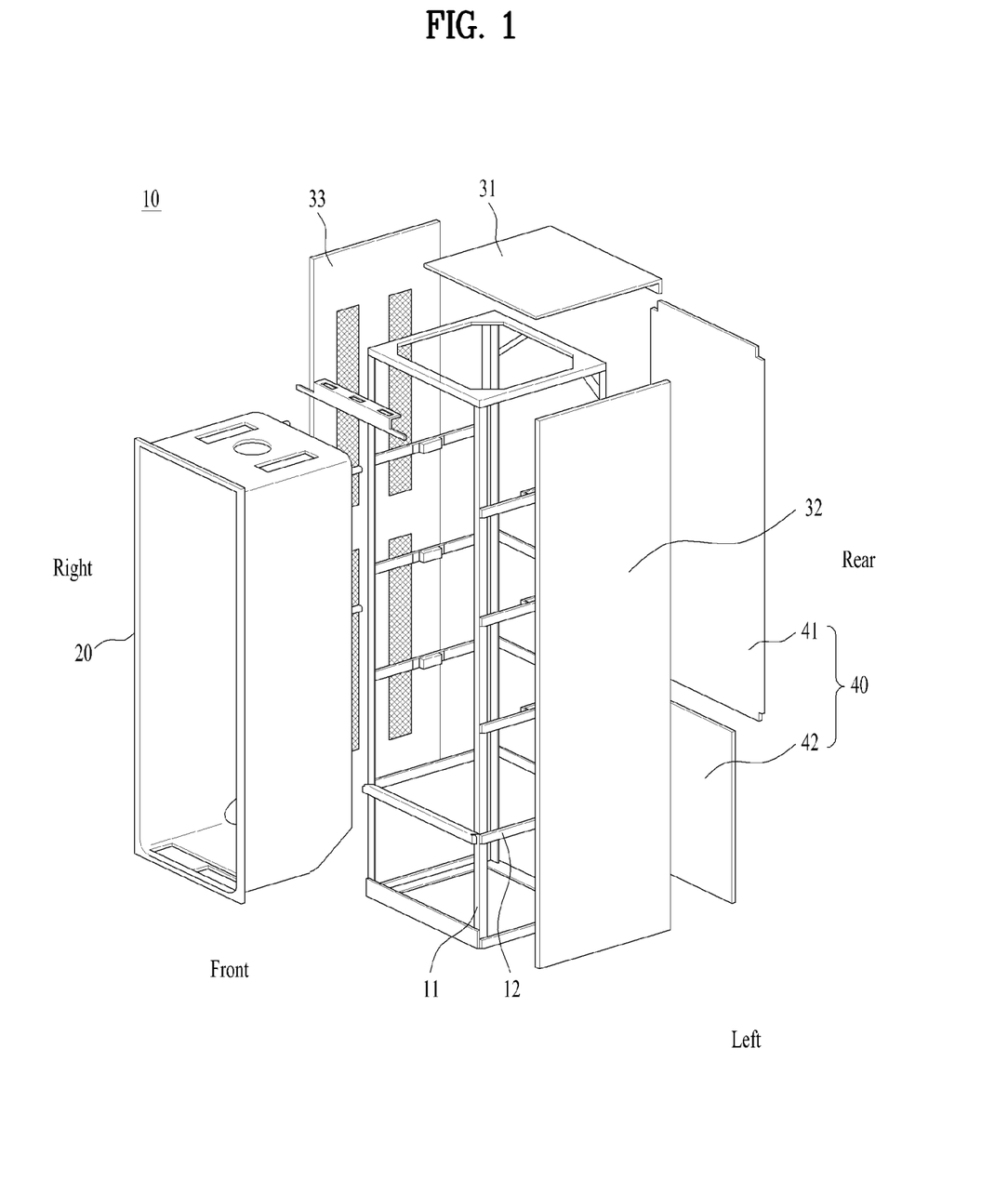
FIG. 1 shows the frames 11 and 12 of the conventional laundry treating apparatus.

In recent years, the laundry treating apparatus has been developed as a single device capable of carrying out all of washing, drying, deodorization, and wrinkle removal. FIG. 1 illustrates a laundry treating apparatus disclosed in Korean Patent Publication No. 10-2009-0124596. Referring to FIG. 1, the laundry treating apparatus includes an inner case 20 configured to provide a space for holding clothes, a hot air supplier (now shown) configured to supply hot air or water into the inner case 20 from the bottom of the inner case 20, and an outer case 31, 32, 33, and 40 disposed outside the inner case 20 and hot air supplier and configured to the external appearance thereof.

While storing clothes in the space provided by the inner case 20, the conventional laundry treating apparatus may deodorize the clothes and remove wrinkles from the clothes by providing hot air through the hot air supplier (not shown), which is disposed at the bottom of a cabinet, or compressing the clothes. In other words, since the laundry treating apparatus provides hot air or water while clothes spread out in the cabinet due to gravity, the laundry treating apparatus may deodorize the clothes and remove wrinkles therefrom without extra devices.

The conventional laundry treating apparatus further includes a frame 10 to fix the shapes of the inner case 20, hot air supplier, and cabinet and improve the durability thereof. The frame 10 may include a plurality of vertical frames 11 provided in the vertical direction and a plurality of horizontal frames 12 configured to couple the vertical frames 11 in the horizontal direction. Accordingly, the frame 10 may stably support the inner case 200 and effectively absorb vibrations generated in the hot air supplier (not shown).

However, there has been some difficulties in manufacturing the laundry treating apparatus. The vertical frames 11 need to be coupled to the horizontal frames 12, the inner case 20 and hot air supplier need to be fixed to the frame 10, and the outer case 31, 32, 33, and 40 needs to be coupled to the frame 10. In particular, when the cabinet is disposed on the top surface 31, the side surfaces 32 and 33, and the rear surface 40, each of these components need to be coupled to the frame 10.

In addition, when the inner case 20 is coupled to the outer case 31, 32, 33, and 40 as well as when the frame 10 is assembled, coupling members, for example, 120 or more volts and nuts are required.

As a result, the following problems have arisen. The manufacturing of the laundry treating apparatus is time-consuming. Also, if a specific coupling member is not completely coupled or omitted, the durability of the laundry treating apparatus is not guaranteed, that is, the defect rate increases.

To solve the above problems, it has been considered that frames are replaced with foamed plastics. To this end, the foamed plastics may be injected between an inner case 120 (see FIG. 2A) and an outer case 110 (see FIG. 2A), which will be described later. When the foamed plastics are injected between the inner case 120 (see FIG. 2) and an outer case 110 (see FIG. 2) for foam molding instead of using frames, it may provide multiple advantages such as noise and vibration reduction, heat insulation improvement, production cost reduction, and so on. However, the structural stiffness may decrease compared to when the frames 11 and 12 are used. In particular, the structural stiffness may decrease at the bottom of a side surface 112 of the outer case 110 so that the bottom of the side surface 112 of the outer case 110 may become vulnerable to bending deformation.

SUMMARY

Technical Problem

One object of the present disclosure is to provide a laundry treating apparatus including a reinforcing portion for compensating for a decrease in the structural stiffness due to the use of foamed plastics. Another object of the present disclosure is to provide a laundry treating apparatus including a reinforcing portion formed in an L shape in conformity with the bottom shape of a side surface of an outer case, which is relatively vulnerable, and designed symmetrically so as to be available on any side surfaces.

Technical Solution

To achieve these objects and other advantages and in accordance with the purpose of the disclosure, an L-shape bracket may be installed at the rear and bottom of each side surfaces of an outer case. The installation of the L-shape bracket may reinforce weak portions. The brackets installed on the two side surfaces are designed to have the same stiffness. Further, since the L-shape bracket is installed between a side surface of a machine room forming portion and a side surface of the outer case during preassembly, the L-shape bracket may be covered by foamed plastics during foaming.

In one aspect of the present disclosure, a laundry treating apparatus is provided. The laundry treating apparatus may include: an outer case having a first front opening; an inner case provided inside the outer case and defining a space for holding clothes; a machine room forming portion located below the inner case and defining a machine room separated from the inner case; a foaming space defined between the outer case and the inner case, between the outer case and the machine room forming portion, and between the inner case and the machine room forming portion; foamed plastics filling the foaming space; and a reinforcing portion located on two side surfaces of the outer case and configured to strengthen the outer case.

The reinforcing portion may be an L-shape bracket. The bracket may include: a first member facing toward a top of the outer case from a bottom of the outer case; a second member facing toward a front of the outer case from a rear of the outer case; and an overlapping portion in which the first and second members overlap and are coupled to each other.

The outer case may further include a second opening. The laundry treating apparatus may further include a rear panel coupled to the second opening and defining a rear surface of the outer case. The rear panel may include a first rear panel coupled to the second opening and defining a rear surface connected to the inner case and a second rear panel coupled to the second opening and defining a rear surface connected to the machine room forming portion.

The laundry treating apparatus may include a base defining a floor of the outer case. The outer case may further include: a first outer case flange extending from a bottom of each of the two side surfaces of the outer case to the other side surface; a first coupling portion coupled to a bottom of the machine room forming portion by a recess of the first outer case flange toward the inner case; a second outer case flange extending from a rear of each of the two side surfaces of the outer case to the other side surface; and a second coupling portion coupled to the machine room forming portion by a recess of the second outer case flange toward the first opening. The bracket may have a shape formed by bending of a long bar two times in a width direction, and an avoidance space for avoiding interference with the first coupling portion and the second coupling portion may be formed when the bracket is installed.

The bar may bend in a length direction such that a length (L1) of the first member is equal to a length (L2) of the second member, so that the bracket may be provided to be coupled to any one of both side surfaces of the outer case.

The bracket may include: a first bracket located at a bottom of one side surface of the outer case; and a second bracket located at a bottom of the other side surface of the outer case.

When the bar bends two times in the width direction, the bracket may include: a first bending surface coupled to the side surface of the outer case; a second bending surface and a third bending surface defining the avoidance space; and a fourth bending surface coupled to the first outer case flange or the second outer case flange. A width (W1) of the first bending surface may be greater than a width (W4) of the fourth bending surface.

A length (LB1) of a first bending surface of the bracket may be greater than a length (LB2) of a fourth bending surface of the bracket.

When the bar bends in a length direction, caulking may be applied the overlapping portion in which the first and second members overlap with each other.

The reinforcing portion may be located within the foaming space. The foamed plastics may be any one of polyurethane, polystyrene, and polyolefin.

Advantageous Effects

As is apparent from the above description, the present disclosure has effects as follows. A reinforcing portion for compensating for a decrease in stiffness caused when foamed plastics are used between inner and outer cases rather than frames may be provided. The reinforcing portion may be commonly used regardless of left and right sides, thereby reducing manufacturing cost. A preassembly process may be simplified. The durability of products may be improved, thereby increasing the reliability of products.

DETAILED DESCRIPTION

Hereinafter, exemplary embodiments of the present disclosure will be described in detail with reference to the accompanying drawings. The configuration of an apparatus or a control method of the apparatus, which will be described below, is merely given to describe the embodiments of the present disclosure but not intended to limit the scope of the present disclosure. The same reference numerals used throughout the specification refer to the same constituent elements.

Certain terminology is used herein for convenience only and is not to be taken as a limitation on the embodiments described. For example, expressions indicating a relative or absolute arrangement such as "in a certain direction", "along a certain direction", "parallel to", "orthogonal to", "center of", "concentric to", and "coaxially" do not only strictly indicate such arrangements but also indicate a state including a tolerance or a relative displacement within an angle and a distance achieving the same function.

For example, expressions indicating a state where the objects are the same such as "the same", "equal to", and "equivalent to" do not only strictly indicate the same state but also indicate a state including a tolerance or a difference achieving the same function.

For example, expressions indicating shapes such as rectangular and cylindrical do not only indicate the shapes such as rectangular and cylindrical in a geometrically strict sense, but also indicate shapes including recesses/protrusions, chamfered portions, and the like, as long as the same effect can be obtained.

Expressions such as "comprising", "including", "includes", "provided with", or "having" a certain component are not exclusive expressions that exclude other components.

For the sake of brief description with reference to the drawings, the same or equivalent components may be provided with the same or similar reference numbers, and description thereof will not be repeated.

A structure applied to one embodiment may be equally applied to another embodiment unless there is any contradiction structurally and functionally.

A singular representation may include a plural representation unless it represents a definitely different meaning from the context.

In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

As described above, the conventional laundry treating apparatus using the frames 11 and 12 has the following problems. The manufacturing of the laundry treating apparatus is time-consuming. If a specific coupling member is not completely coupled or omitted, the durability of the laundry treating apparatus is not guaranteed. That is, the defect rate increases.

To solve the above problems, the frames 11 and 12 may be replaced with foamed plastics. The foamed plastics are polymer materials with foam or porous structures, which are obtained by generating gases using a foaming agent. Further, the foamed plastic may mean an inhomogeneous suspension of solid polymer materials and gases.

The foamed plastics are widely used as functional composites in various products due to their low weight, high impact absorption, high sound insulation, high heat insulation, etc. Any one of polyurethane, polystyrene, and polyolefin may be used as the raw polymer material of the foamed plastics. In addition to that, phenolic resin, polyvinyl chloride, urea resin, silicon, polyimide, and melamine resin may be foamed and used.

In particular, polyurethanes are polymers composed of a soft segment consisting of polyols and a hard segment generated by reaction with diisocyanates. The properties of a segmented polyurethane polymer vary depending on the types of raw materials and composite methods so that the polyurethane polymer may be used for various purposes. Particularly, the combination of isocyanates and hydroxyl groups is defined as a urethane combination, and the polyurethanes are coupling of multiple urethane combinations. If urethane combinations are selectively created under various conditions, polyurethanes with high elasticity, polyurethanes as soft as rubber, polyurethanes as stiff as wood, etc. may be made, and the characteristics thereof may be controlled as desired.

The polyurethanes have been widely used as insulators and, more particularly, as foamed materials for energy saving. Recently, the polyurethanes have also been widely used as insulators in electric and electronic products.

Polyurethane foam is composed of a solid polymer and a foaming gas. As the reaction temperature increases during the polyurethane synthesis reaction, the foaming gas evaporates and is placed in a cell in the foam, whereby the foaming gas partially acts as a thermal barrier.

Foaming agents mixed into a polyurethane polymer to change the polyurethane polymer into a foamed polyurethane polymer may be divided into chemical foaming agents and physical foaming agents. The chemical foaming agent forms bubbles by chemical reactions, and the physical foaming agent forms bubbles by the physical state change of a compression gas or the state change (evaporation) of a liquid.

For example, when the chemical foaming agent is used, water molecules and isocyanates react to form unstable carbonic acid, which is decomposed into amine and carbon dioxide. The amine reacts again with the rest of the isocyanates to form urea bonds, and the carbon dioxide forms new bubbles in the polymer. The resulting gas grows existing bubbles and, at the same time, creates new bubbles. However, this is merely exemplary, and various foaming agents may be used depending on the purpose.

For foam molding, the preassembled laundry treating apparatus 100 may be put into a prepared foaming mold or foaming jig, and then foamed plastics may be injected into inlets 1411 to 1416 disposed on the laundry treating apparatus 100.

Since the foamed plastics are in a liquid state before the injection, the foamed plastics may harden during the foam molding after being injected through the inlets 1411 to 1416. A foaming agent may be injected as when the foaming agent is in the liquid state. Thus, it is important to prevent the foamed plastics from leaking.

The inlets 1411 to 1416 may be disposed on a rear panel portion 140, which is provided at the rear of the laundry treating apparatus 100. The foamed plastics enters foaming spaces 921 to 925 (see FIG. 2B) through the inlets 1411 to 1416. In other words, the foaming spaces 921 to 925 are filled with the foamed plastics. Air in the foaming space or gases generated during the foaming may be discharged through a gas outlet 1419. The reason for this is to prevent that the foamed plastics do not completely fill the foaming spaces 921 to 925 (see FIG. 2B) due to residual gases or that the inner case 120, outer case 110, or machine room forming portion 300 is deformed by foaming pressure.

If there is a crack in the laundry treating apparatus 100, the foamed plastics may leak from the crack. This may be interpreted to mean that the foamed plastics flow into other spaces rather than the foaming spaces 921 to 925 (see FIG. 2B). To avoid the leakage, all cracks and holes need to be filled up by preassembling the laundry treating apparatus 100 before the foam molding.

Figure 2A:
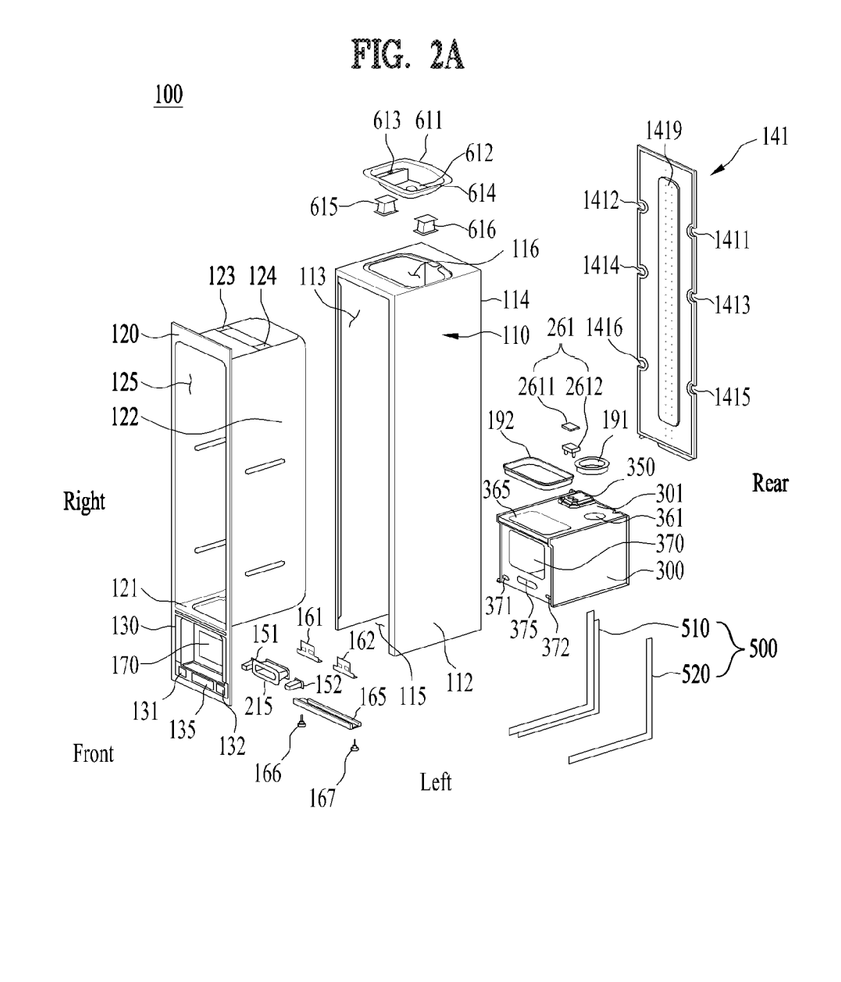
FIG. 2A is an exploded view of a laundry treating apparatus preassembled before foam molding according to an embodiment of the present disclosure.

FIG. 2A is an exploded view of components that need to be preassembled to define the foaming spaces and avoid the leakage before the preassembled laundry treating apparatus is put into the foaming mold or foaming jig for the injection of the foamed plastics.

Referring to FIG. 2A, the outer case 110 and the inner case 120 may be assembled. The outer case 110 may include a first opening 113 having an opening at the front thereof, a second opening 114 having an opening at the rear thereof, a third opening 115 having an opening at the bottom thereof, and a fourth opening 116 having a partial opening at the top thereof. The inner case 120 may be disposed inside the outer case 110 and define a space 125 for holding clothes.

A moving hanger installation body 611 for installing a moving hanger may be installed in the fourth opening 116 of the outer case 110. The moving hanger installation body 611 may include a driver installation hole 612 for installing a driver of the moving hanger and coupling portion insertion holes 613 and 614 into which a coupling portion for coupling a moving hanger bar is inserted.

In addition, inner case through holes 123 and 124, which are connected to the coupling portion insertion holes 613 and 614, may be defined at the top of the inner case 120.

The driver installation hole 612 may require a cover (not shown) for blocking the hole to form a first foaming space 921, which is defined between the top of the inner case 120 and the top of the outer case 110 and filled with the foamed plastics. Thus, there may be no leakage even when the foamed plastics are injected into the first foaming space 921 (see FIG. 2B).

A tank installation portion 130 for installing a water supply and drain tank (not shown) may be disposed at the bottom of the inner case 120. The water supply and drain tank may be configured to store water for steam generation and drain condensate water. The tank installation portion 130 may be integrated with the inner case 120 or provided separately from the inner case 120. A door (not shown), which is rotatably and movably coupled to the outer case 110 and configured to open and close the front of the inner case 120, may be installed at the bottom of the tank installation portion 130. The door may be rotatably and movably coupled to the left or right side of the outer case 110 depending on a user selection. That is, the door may be coupled to either the right or left side. Such a door is referred to as a reversible door.

Wire paths may be required for control signal exchange between a display (not shown) and multiple sensors (not shown), which are disposed on the door, and a controller (not shown) disposed on the machine room 200. To this end, a first tank installation portion through hole 131 and a second tank installation portion through hole 132 may be defined at the bottom of the tank installation portion 130. The first tank installation portion through hole 131 is coupled to a first coupling body 151, and the first coupling body 151 is coupled to a fourth forming portion through hole 371 of the machine room forming portion 300, which will be described later, thereby forming an enclosed wire path.

Similarly, the second tank installation portion through hole 132 is coupled to a second coupling body 152, and the second coupling body 152 is coupled to a fifth forming portion through hole 372 of the machine room forming portion 300, which will be described later, thereby forming an enclosed wire path. These enclosed paths may prevent the leakage of the foamed plastics even when the foamed plastics are injected into the machine room forming portion 300 and tank installation portion 130.

Since the wire paths may change depending on whether the door is coupled to the right or left, it needs to be considered in the design.

A machine room through hole 170 connected to the machine room 200 may be defined in the tank installation portion 130. A water supply and drain pipe or valve of the water supply and drain tank may be connected to the inside of the machine room 200 through a third forming portion through hole 370 of the machine room forming portion 300. Thus, covers for sealing the machine room through hole 170 and third forming portion through hole 370 may be required to prevent the leakage of the foamed plastics.

A third tank installation portion through hole 135 configured to flow external air into an heat exchanger 220 in the machine room 200 may be provided at the bottom of the tank installation portion 130. The third tank installation portion through hole 135 may be coupled to a third inlet duct 215, and the third inlet duct 215 may be coupled to a sixth forming portion through hole 375 of the machine room forming portion 300, which will be described later, thereby forming an sealed path for drawing external air. The third inlet duct 215 may prevent the leakage of the foamed plastics even when the foamed plastics are injected into the machine room forming portion 300 and tank installation portion 130.

A leg fixing portion 165 may be provided at the front of the third opening 115 defined on the bottom of the outer case 110. The leg fixing portion 165 may be in contact with the bottom of the tank installation portion 130 and coupled to a first screw 166 and a second screw 167 for placing the laundry treating apparatus 100 in parallel to the ground. A first bracket 161 and a second bracket 162 may be used to couple the leg fixing portion 165 to the bottom of the tank installation portion 130.

Thus, a space between the machine room forming portion 300 and the tank installation portion 130 are all enclosed by the leg fixing portion 165, the first coupling body 151, the second coupling body 152, the third inlet duct 215, and the covers of the machine room through hole 170 and third forming portion through hole 370. That is, the enclosed space may form a fifth foaming space 925 (see FIG. 2B) where the foamed plastics are foamed. The fifth foaming space 925 (see FIG. 2B) may prevent the leakage of the foamed plastics during the injection of the foamed plastics.

A second foaming space 922 (see FIG. 2B), where the foamed plastics are injected and foamed, may be provided between a side surface 122 of the inner case 120 and a side surface 112 of the outer case 110. In addition, a fourth foaming space 924 (see FIG. 2B), where the foamed plastics are injected and foamed, may be provided between a side surface 320 of the machine room forming portion 300 and the side surface 112 of the outer case 110.

The inner case 120 may include the space 125 for holding clothes. The first through portion 1211 (see FIG. 3), which is connected to the machine room 300 and configured to provide steam into the inner case 120, may be defined on a bottom surface 121 of the inner case 120. Also, a second through portion 1212 (see FIG. 3), which is configured to provide air into the inner case 120 may be defined on the bottom surface 121 of the inner case 120. Further, a third through portion 1213 (see FIG. 3), which is configured to discharge air to the machine room 300, may be defined on the bottom surface 121 of the inner case 120. The bottom surface 121 (see FIG. 3) may be inclined in the direction of the third through portion 1213 so that condensed steam may be discharged.

Since the steam nozzle 260 is disposed between the first through portion 1211 (see FIG. 3) and a mounting surface 350 of the machine room forming portion 300, it is possible to prevent leakage through a first mounting surface through hole 351 (see FIG. 5) and a second mounting surface through hole 352 (see FIG. 5), which are defined between the first through portion 1211 (see FIG. 3) and the mounting surface 350.

A first rotation coupling body 191 may be provided between the second through portion 1212 (see FIG. 3) and a first forming portion through hole 361, and a second rotation coupling body 192 may be provided between the third through portion 1213, (see FIG. 3) and a second forming portion through hole 362. Thus, a third foaming space 923, which is provided between the top surface of the machine room forming portion 300 (i.e., a first machine room forming surface 310) and the bottom surface 121 of the inner case 120, is sealed. The sealing of the third foaming space 923 may prevent the leakage of the foamed plastics.

The forming spaces, which are defined between the outer case 110 and inner case 120, between the outer case 110 and machine room forming portion 300, between the inner case 120 and machine room forming portion 300, may be filled with the foamed plastics. All of the foaming spaces may be integrated.

In other words, the first foaming space 921 (see FIG. 2B), second foaming space 922 (see FIG. 2B), third foaming space 923 (see FIG. 2B), fourth foaming space 924 (see FIG. 28), and fifth foaming space 925 (see FIG. 2B) may be connected to each other. Thus, when the foamed plastics are injected through the inlets 1411 to 1416 disposed on a first rear panel 141, the foamed plastics may flow into and fill in all of the foaming spaces.

Before the injection of the foamed plastics, a reinforcing portion 500 may be installed between each side surface 320 of the machine room forming portion 300 and each side surface 112 of the outer case 110. The reinforcing portion 500 is provided to prevent the outer case 110 from being deformed when the bottom of the outer case 110 becomes weak.

The reinforcing portion 500 is an L-shape bracket. That is, the reinforcing portion 500 is coupled to a rear portion of the side surface of 112 of the outer case 110, which is coupled to a second rear panel 142, and a bottom portion of the side surface 112 of the outer case 110, which is coupled to a base 190 that forms the floor of the laundry treating apparatus 100. A length L2 of the reinforcing portion 500 coupled to the rear portion of the side surface of 112 of the outer case 110, which is coupled to the second rear panel 142, may be the same as the length L1 of the reinforcing portion 500 coupled to the bottom portion of the side surface 112 of the outer case 110, which is coupled to the base 190 that forms the floor of the laundry treating apparatus 100. Accordingly, the reinforcing portion 500 may be commonly installed on two side surfaces.

The reinforcing portion 500 may include a first bracket 510 and a second bracket 520 installed on the two side surfaces 112 of the outer case 110. Each bracket may be coupled to any one side surface 112 of the outer case 110 as described above.

Figure 2B:
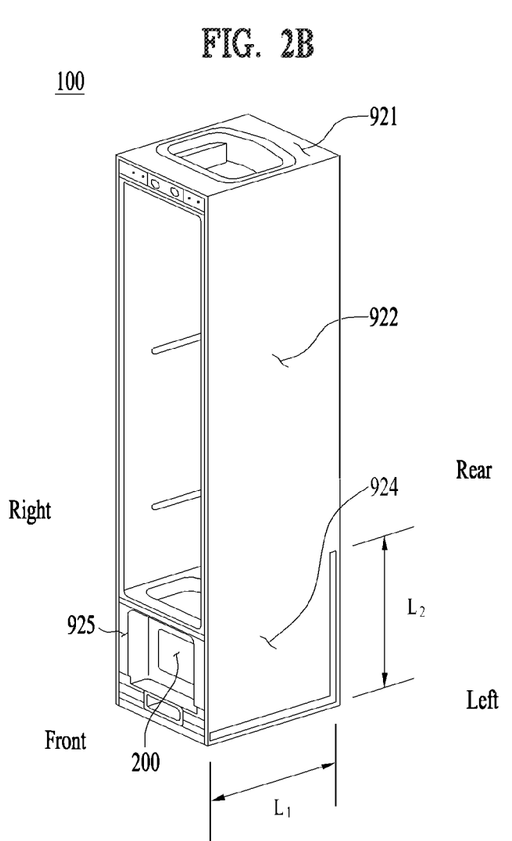
FIG. 2B shows the laundry treating apparatus after the foam molding viewed from the front thereof.

FIG. 2(*b*) shows that the components shown in FIG. 2A are preassembled. Although the reinforcing portion 500 is invisible after assembly, FIG. 2B shows the reinforcing portion 500 to indicate the location thereof.

The foamed plastics including a foaming material (agent) are injected through the inlets 1411 to 1416 disposed on the first rear panel 141, which is provided at the rear of the preassembled laundry treating apparatus 100, and residual gases are discharged through the gas outlet 1419 on the first rear panel 141.

Figure 3:
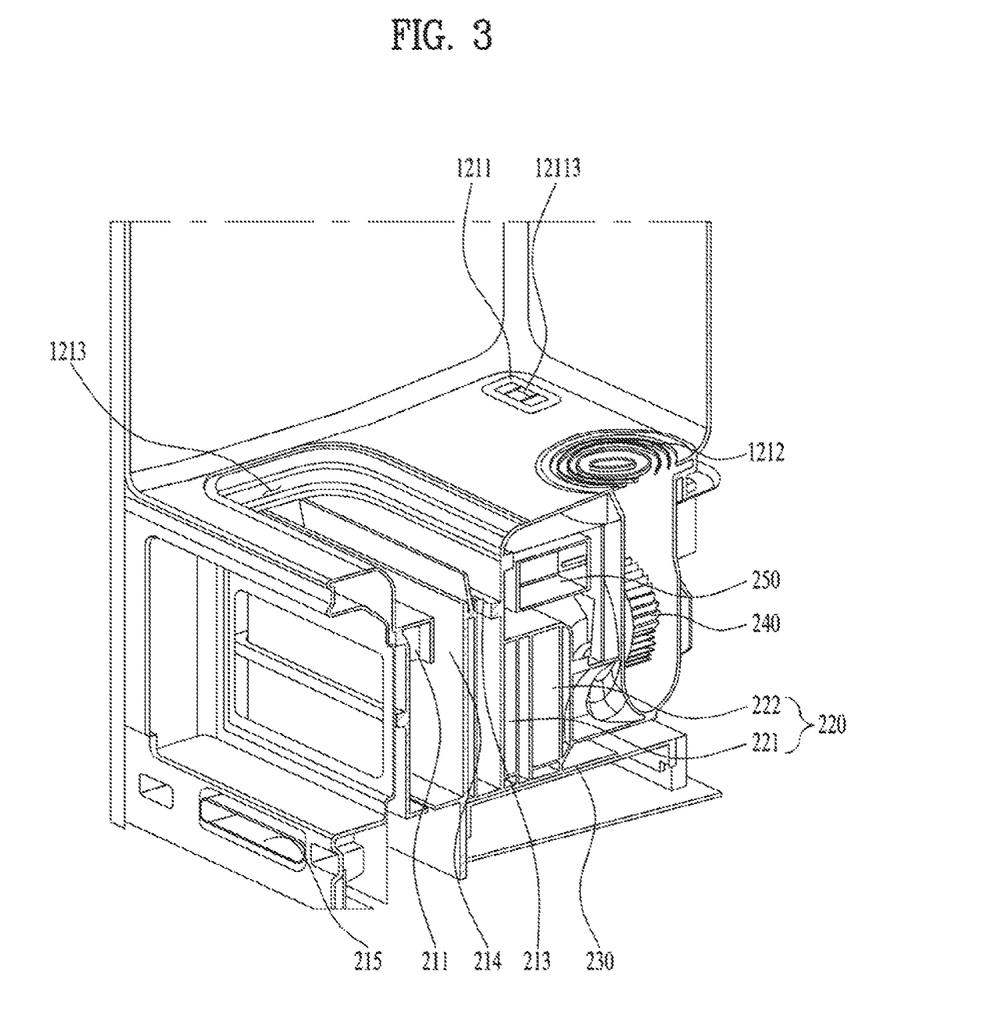
FIG. 3 shows a heat exchanger 220 and a steam generator 250 installed in the machine room 200 and a first through portion 1211 provided in the inner case 120.

FIG. 3 shows a cross-section of the inner case 120 and machine room 200. In FIG. 3, inlet ducts 211, 212, and 215 configured to provide air into the inner case 120, the heat exchanger 220 including an evaporator 221 and a condenser 222, a steam generator 250 configured to provide steam are illustrated. In addition, the first through portion 1211 provided at the bottom surface 121 of the inner case 120 and configured to provide steam, the second through portion 1212 configured to provide air, and the third through portion 1213 configured to discharge air or steam to the machine room 200 are illustrated. The steam generator 250 may include a heater and provide steam into the inner case 120 through the steam nozzle 260 (see FIG. 2A) by vaporizing water supplied from the water supply tank (not shown).

Figure 4:
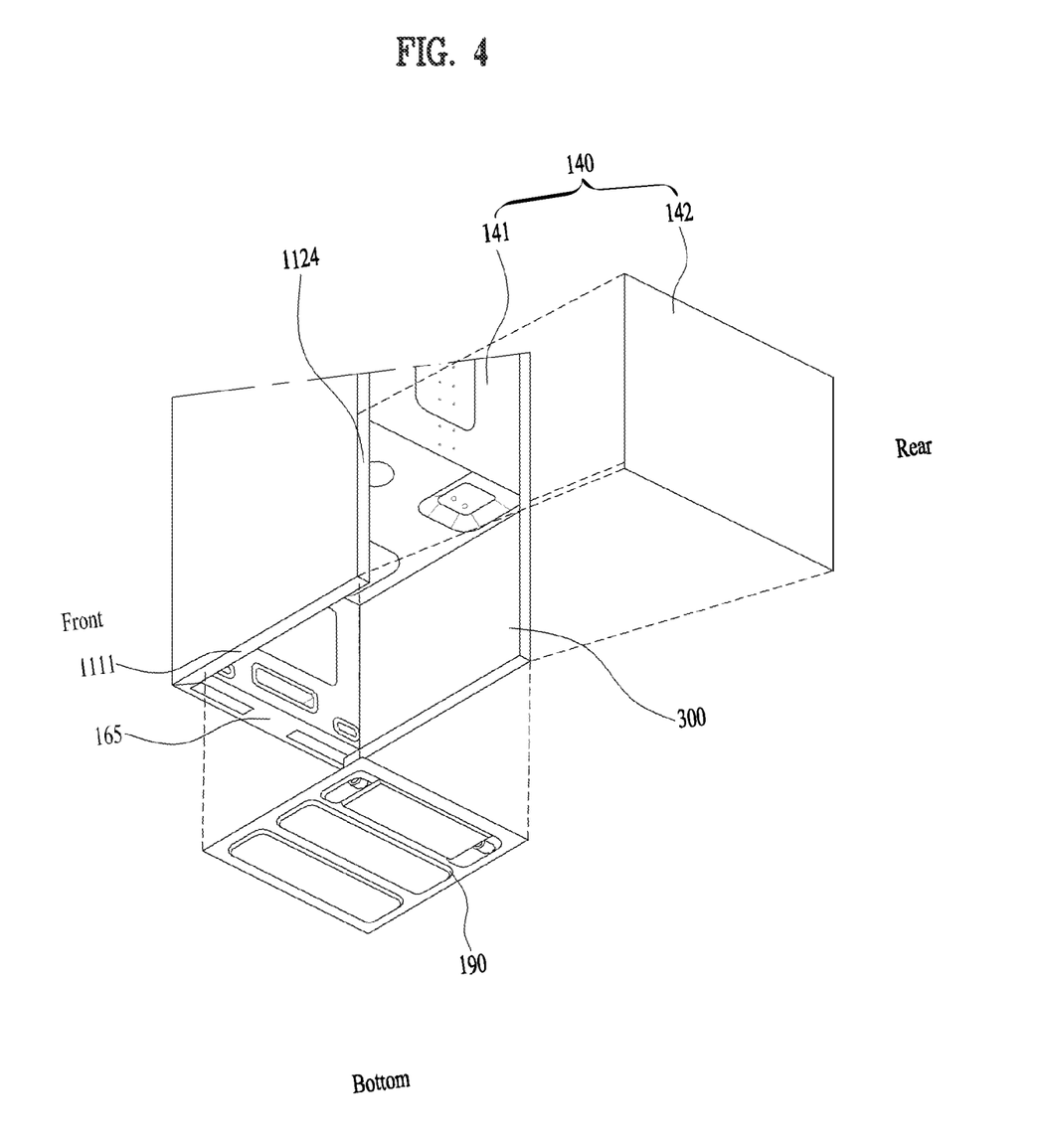
FIG. 4 shows a second rear panel 142 and a base 190 disassembled from the laundry treating apparatus.

FIG. 4 is a view of the preassembled laundry treating apparatus viewed from the rear and bottom thereof. The base 190 may be coupled to the two side surfaces 112 of the outer case 110 in the direction of the third opening 115 of the outer case 310. The base 190 may define the floor of the laundry treating apparatus 100. A first outer case flange 111 may extend from two edges facing in the direction of the third opening 115 on the two side surfaces 112 of the outer case 110. The first outer case flange 1111 may be coupled to a fifth forming portion flange 3255 of the machine room forming portion 300, which will be described later.

The first rear panel 141 may be coupled to the outer case 110 in the direction of the second opening 114, and the second rear panel 142 may be disposed at a location corresponding to that of the machine room forming portion 300. The rear panels 141 and 142 may define the rear surface of the outer case 110. A second outer case flange 1121 may extend from two edges facing in the direction of the second opening 114 on the two side surfaces 112 of the outer case 110. The second outer case flange 1121 may be coupled to a fourth forming portion flange 3244 of the machine room forming portion 300, which will be described later.

Figure 5A:
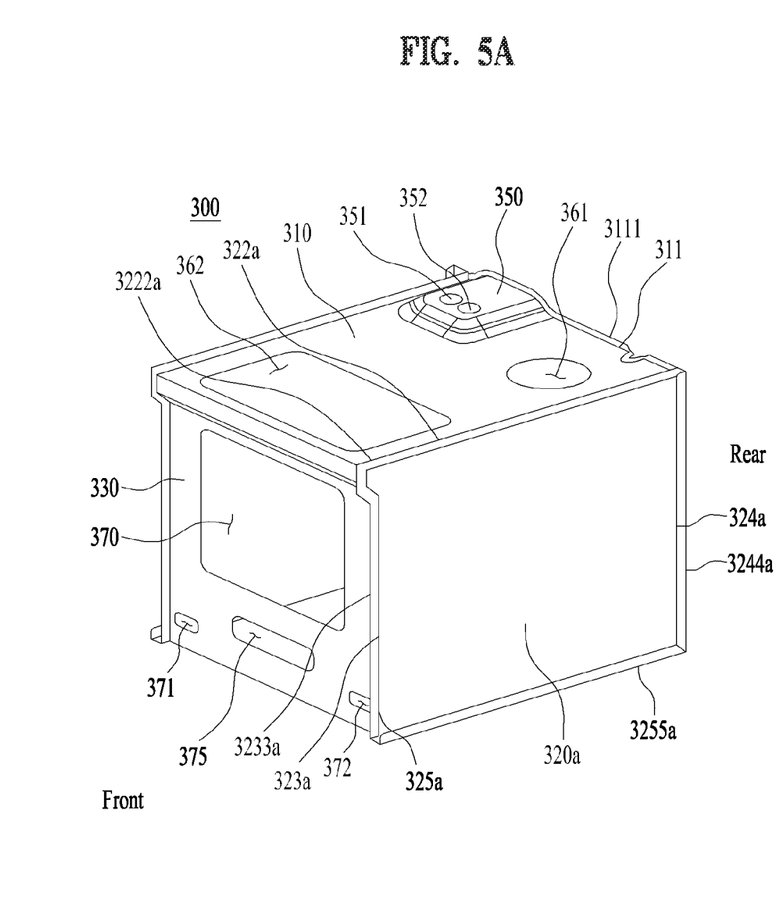
FIG. 5A is a view of a machine room forming portion 300 viewed from the front thereof.
Figure 5B:
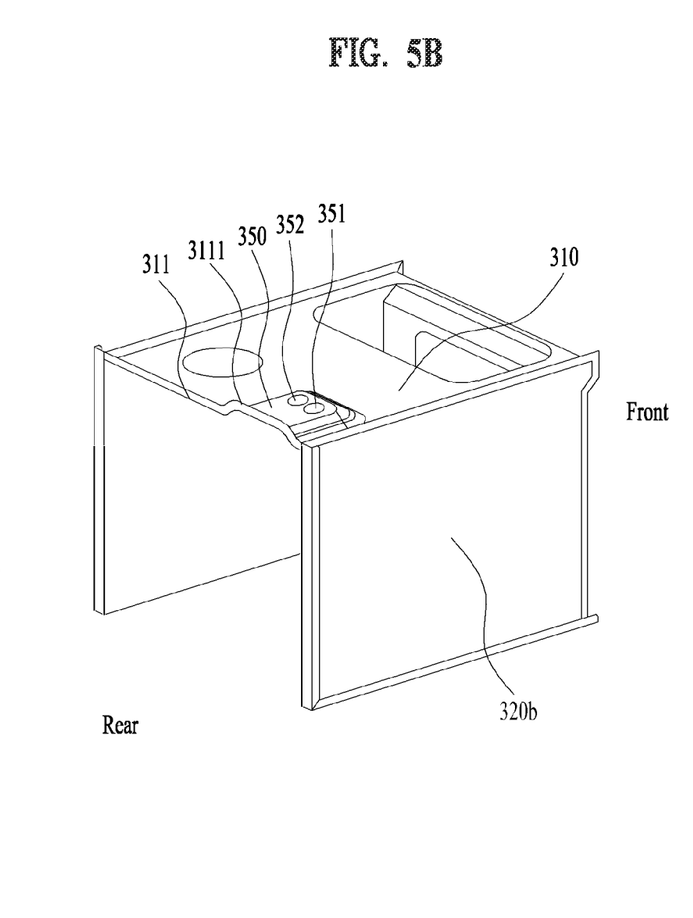
FIG. 5B is a view of the machine room forming portion 300 viewed from the rear thereof.

FIG. 5 shows the machine room forming portion 300 provided at the bottom of the inner case 120. Specifically, FIG. 5A is a view of the machine room forming portion 300 viewed from the front thereof, and FIG. 5B is a view of the machine room forming portion 300 viewed from the rear thereof. The machine room forming portion 300 is preassembled before the foam molding. The reason for this is to provide a space so-called "machine room" after the foam molding. The machine room forming portion 300 is opened in the directions of the second opening 114 and third opening 115 of the outer case 110. The first machine room forming surface 310 defining the top surface may include the mounting surface 350, first forming portion through hole 361, and second forming portion through hole 362. The machine room forming portion 300 may further include second machine room forming surfaces 320 defining two side surfaces, the third forming portion through hole 370 defining the front surface of the machine room forming portion 300 and connected to the tank installation portion 130, and a third machine room forming surface 330 including the fourth forming portion through hole 371, fifth forming portion through hole 372, and sixth forming portion through hole 375.

As described above, the first rotation coupling body 191 may be coupled to the first forming portion through hole 361 penetrating the first machine room forming surface 310, and the second rotation coupling body 192 may be coupled to the second forming portion through hole 362 penetrating the first machine room forming surface 310. Thus, it is possible to prevent the foamed plastics from leaking from the third foaming space 923 through the through holes on first machine room forming surface 310.

The water supply and drain pipe or valve of the water supply and drain tank may be connected to the inside of the machine room 200 through the third forming portion through hole 370 penetrating the third machine room forming surface 330. Thus, the cover for sealing the machine room through hole 170 may be required to prevent the leakage of the foamed plastics.

To form wire paths, the fourth forming portion through hole 371 and fifth forming portion through hole 372 penetrating the third machine room forming surface 330 may be connected to the first coupling body 151 and second coupling body 152, respectively. These connections may prevent leakage from the fifth foaming space 925 to the machine room forming portion 300.

The sixth forming portion through hole 375 penetrating the third machine room forming surface 330 may configured to draw external air through the connection with the third inlet duct 215 and perform dehumidification through the heat exchanger 220. The third inlet duct 215 may prevent leakage from the fifth foaming space 925 to the machine room forming portion 300.

The first machine room forming surface 310 may include a first edge, which is an edge placed in the direction of the second opening 114 of the outer case 110 and second edges 322, which are two edges in contact with the second machine room forming surfaces 320.

The second machine room forming surfaces 320 defining the two side surfaces of the machine room forming portion 300 may include the second edges 322, a third edge 323 in contact with the third machine room forming surface 330, a fourth edge 324 placed in the direction of the second opening 114, and a fifth edge 325 in contact with the base 190 and placed in the direction of the third opening 115. The reinforcing portion 500 may be provided between each of the second machine room forming surfaces 320 and the outer case 110.

A part of the first machine room forming surface 310 including the first edge 311 may be elevated toward the bottom surface 121 of the inner case 120 so as to form the mounting surface 350. The elevated length of the mounting surface 350 from the first machine room forming surface 310 may be smaller than the height of the third foaming space 923 where the mounting surface 350 is placed, that is, the distance between the bottom surface 121 of the inner case 120 and the first machine room forming surface 310. Accordingly, when the machine room forming portion 300 is preassembled with the bottom of the inner case 120, the machine room forming portion 300 may not be interference by the mounting surface 350.

Further, the preassembled steam nozzle 260 may prevent the elevation of the mounting surface 350 from being interfered by the mold or zig (not shown) inserted into the machine room forming portion 300 during the foaming.

To prevent the machine room forming portion 300 (see FIG. 2A) from being deformed by the foaming pressure during the foam molding or from being changed unexpectedly during the hardening of the foamed plastics, an intermediate mold, an intermediate jig, etc. may be inserted so that the machine room 200 (see FIG. 2B) may act as the secondary supporter (not shown). In this case, the insertion of the intermediate mold or zig may be disturbed by a steam inlet 2641 and a condensate water outlet 2645 disposed in the steam nozzle 260, which are illustrated in FIG. 7. To avoid this problem, the inserted length (IL) of the steam inlet 2641 and condensate water outlet 2645 may be designed to be smaller than the elevated length (EL) of the mounting surface 350.

The mounting surface 350 may include first mounting surface through hole 351 into which the steam inlet 2641 is inserted and the second mounting surface through hole 352 in to which the condensate water outlet 2645 is inserted. A mounting surface protruding portion 355 (see FIG. 6B) may be defined on the first mounting surface through hole 351 and second mounting surface through hole 352 such that the first mounting surface through hole 351 and second mounting surface through hole 352 protrude toward the inner case 120. The mounting surface 350 may be coupled to the first machine room forming surface 310 along the inclined surface.

A part of the first edge 311 may also be elevated when the mounting surface 350 is elevated. The entirety of the first edge 311 including the elevated part may include a first forming portion flange 3111 that extends from the first edge 311 in the direction of the inner case 120.

Since the second machine room forming surfaces 320 defining the two side surfaces of the machine room forming portion 300 are bilateral symmetry, one of them will be described. One of the second machine room forming surfaces 320 may include the second edge 322, third edge 323, fourth edge 324, and fifth edge 325. The second edge 322 may include a second forming portion flange 3222 that extends toward the inner case 120. The first forming portion flange 3111 and second forming portion flange 3222 may have the same EL. The third edge 323 may include a third forming portion flange 3233 that extends toward the tank installation portion 130. The third forming portion flange 3233 may be the same EL as the first forming portion flange 3111. Thus, the first forming portion flange 3111, second forming portion flange 3222, and third forming portion flange 3233 may be integrated with no gaps.

The fourth edge 324 may be bent after extending toward the side surface 112 of the outer case 110 and then extend toward the tank installation portion 130. Thus, the fourth edge 324 may become an L-shape flange viewed from the top so that it may be inserted into and coupled to the second outer case flange 1121. This may prevent the leakage of the foamed plastics by coupling a part of the second opening 115 to the machine room forming portion 300. The rest of the second opening 115 may be coupled to the first rear panel 141.

The fifth edge 325 may be bent after extending toward the side surface 112 of the outer case 110 and then extend toward the inner case 110. Thus, the fifth edge 325 may become an L-shape flange viewed from the front so that it may be inserted into and coupled to the first outer case flange 1111.

The reinforcing portion 500 may include the first bracket 510 and second bracket 520 to be installed on the two side surfaces. The first bracket 510 and second bracket 520 may have the same shape and size. As described above, the reinforcing portion 500 may be designed to be commonly installed on the two side surfaces of the outer case 110. Thus, the first bracket 510 will be described herein.

Figure 6A:
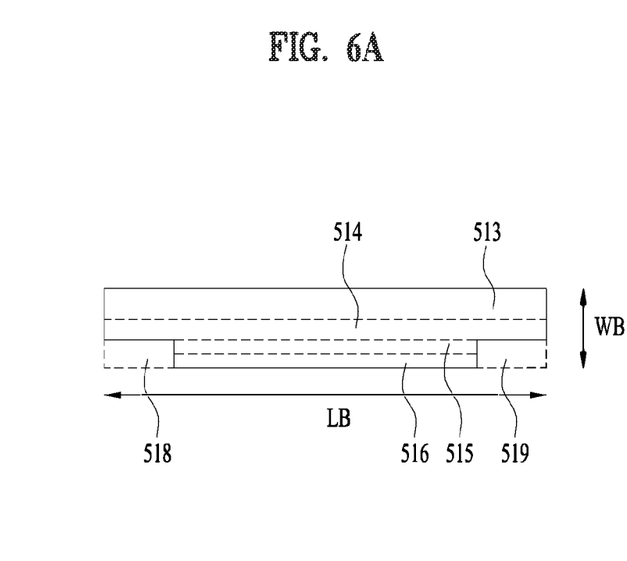
FIG. 6A shows a first bracket 510 before bending.
Figure 6B:
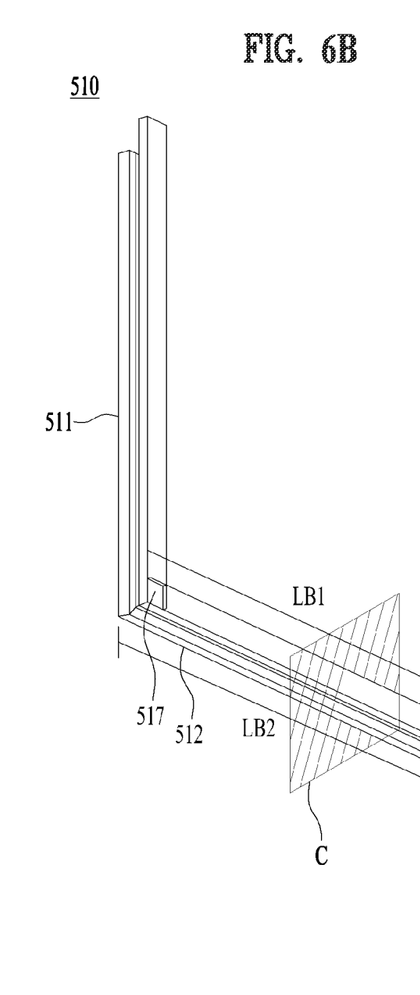
FIG. 6B shows the first bracket 510 after the bending.

FIG. 6A shows the first bracket 510 before bending. A rectangular metal sheet where the length is greater than the width (length of bar (LB) is greater than width of bar (WB)) bends three times in the width direction and then bends once in the length direction so that the rectangular metal sheet may be shaped as shown in FIG. 6B.

A first cutout portion 518 and a second cutout portion 519, each of which having a predetermined size, may be cut away from the rectangular metal sheet. However, this is merely exemplary, and the rectangular metal sheet may bend with no cut.

The rectangular metal sheet may bend three times in the width direction so that a first bending surface 513, a second bending surface 514, a third bending surface 515, and a fourth bending surface 516 may be defined. The reason for this is that the bending of the rectangular metal sheet may increase the stiffness. A coupling space may be required for coupling between the outer case 110 and the first rear panel 141 and coupling between the outer case 110 and the machine room forming portion 300. Accordingly, the bending of the rectangular metal sheet may define an avoidance space for avoiding the coupling when the reinforcing portion 500 is coupled to the side surface 112 of the outer case 110.

The first cutout portion 518 and second cutout portion 519 may be cut away from the third bending surface 515 and fourth bending surface 516. Thus, the length LB2 of the third bending surface 515 and fourth bending surface 516 may be smaller than the length LB1 of the first bending surface 513 and second bending surface 514.

Figure 6C:
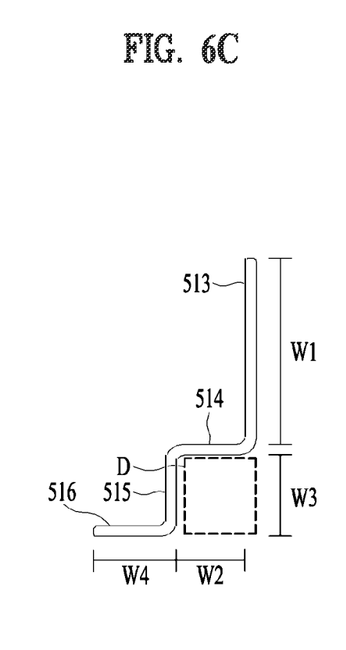
FIG. 6C shows a cross-section of the first bracket 510.

FIG. 6C shows a cross-section of FIG. 6B taken along surface C.

The width W1 of the first bending surface 513 may be longer than the widths W2, W3, and W4 of the other bending surfaces. The reason for this is to increase a contact area with the side surface 112 of the outer case 110 and increase the stiffness of the outer case 110.

When the rectangular metal sheet bends once in the length direction, a first member 511 and a second member 512 may be defined. In addition, an overlapping portion 517 where the first member 511 and second member 512 overlap may also be defined. Caulking may be applied to the overlapping portion 517.

The bracket may be installed on the side surface 112 of the outer case 110. Specifically, the first member 511 may be coupled to the side surface 112 of the outer case 110 in the direction of the second opening 114, and the second member 512 may be coupled to the side surface 112 of the outer case 110 in the direction of the third opening 115. That is, the overlapping portion 517 may be coupled to the corner of the side surface 112 of the outer case 110 where the second opening 114 and third opening 115 meet.

From the perspective of the bending surface, the first bending surface 513 may be coupled to the side surface 112 of the outer case 110, and the fourth bending surface 516 may be coupled to the first outer case flange 1111 or second outer case flange 1121.

The length $L_1$ of the first member 511 may be equal to the length $L_2$ of the second member 512. Thus, the first bracket 510 may be coupled to any one of the two side surfaces 112 of the outer case 110 as described above. The first bracket 510 and second bracket 520 may be in mirror symmetry to each other. In summary, both the first bracket 510 and second bracket 520 may be installed on any one of the two side surfaces 112 of the outer case 110.

FIG. 6B shows the first bracket 510 after the bending, and FIG. 6C shows a cross-section of the first bracket 510. The second bending surface 514 and third bending surface 515 may define the avoidance space D. The avoidance space D is required to avoid the coupling between the outer case 110 and the first rear panel 141 and the coupling between the outer case 111 and the machine room forming portion 300 when the reinforcing portion 500 is coupled to the side surface 112 of the outer case 110.

The first bracket 510 and second bracket 520 may be coupled to the two side surfaces 112 of the outer case 110 using a double-sided adhesive tape during the preassembly. The first bracket 510 and second bracket 520 may be installed in the second foaming space 922 and third foaming space 923, which are formed on the side surfaces 112 of the outer case 110. Since the second foaming space 922 and third foaming space 923 are filled with the foamed plastics and the foamed plastics harden, the first bracket 510 and second bracket 520 may be fixed by the double-sided adhesive tape during the preassembly with no other coupling members. Since the brackets 510 and 520 include screw holes (not shown) and the first outer case flange 1111 and second outer case flange 1121 include screw holes (not shown) related thereto, they may be coupled by screws during or after the preassembly.

Figure 7A:
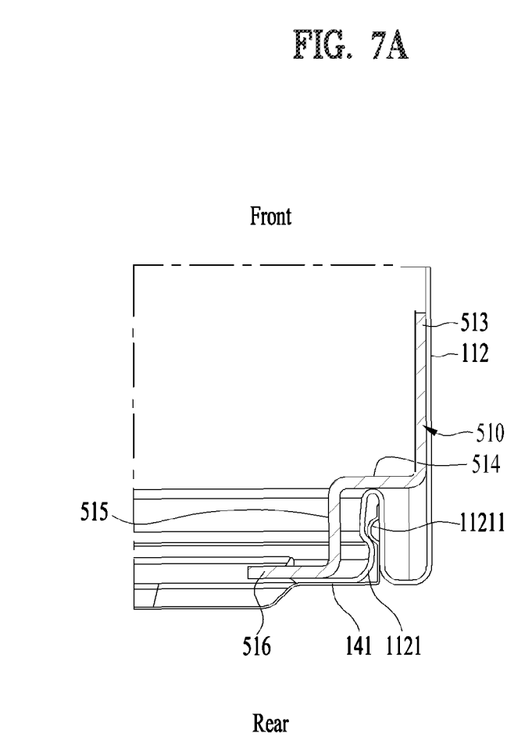
FIG. 7A shows a cross-section of a second coupling portion 11211 in which a first rear panel 141 is coupled to one side surface 112 of an outer case 110 and the first bracket 510 coupled by avoiding the second coupling portion 11211.
Figure 7B:
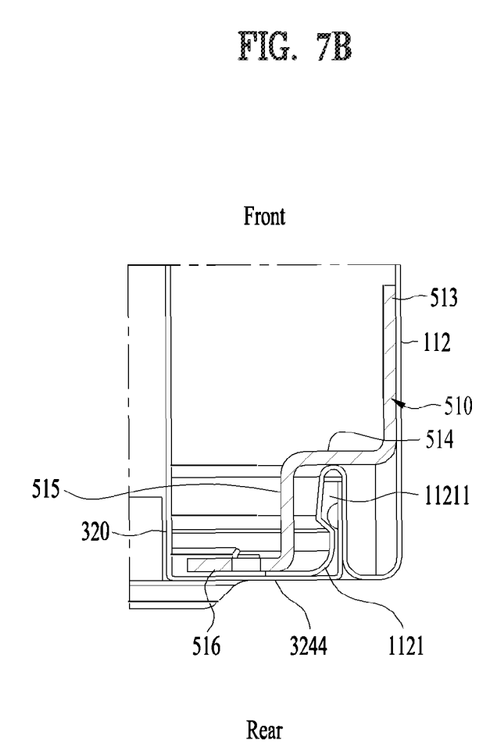
FIG. 7B shows a cross-section of a fourth forming portion flange 3244 extending from one side surface of the machine room forming portion 300, the second coupling portion 11211 on one side surface 112 of the outer case 110, and the first bracket 510 coupled by avoiding the second coupling portion 11211.
Figure 7C:
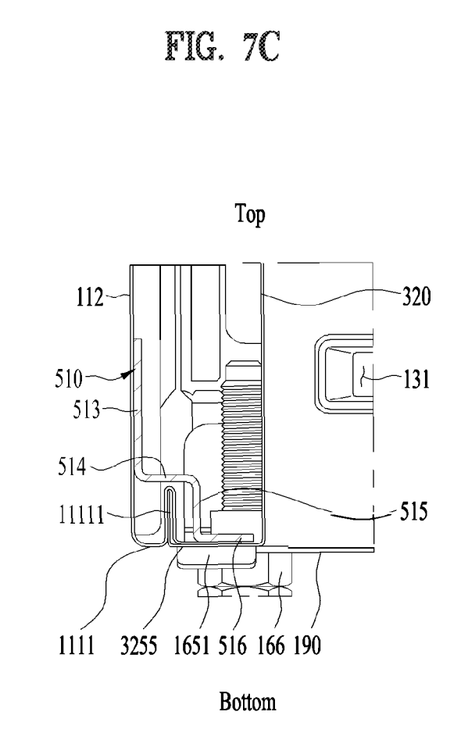
FIG. 7C shows a fifth forming portion flange 3255 on one side surface of the machine room forming portion 300, a first coupling portion 11111 of a first outer case flange 1111 extending from the bottom of one side surface 112 of the outer case 110, and a second bracket 520 coupled by avoiding the first coupling portion 11111.

FIGS. 7A and 7B show a cross-section where the first bracket 510 is coupled to the side surface 112 of the outer case 110, the second outer case flange 1121, and the machine room forming portion 300. FIG. 7C shows a cross-section where the first bracket 510 is coupled to the side surface 112 of the outer case 110 and the first outer case flange 1111.

Referring to FIG. 2B, it may be seen that the length of the first member 511 of the first bracket 510 is greater than the height of the machine room forming portion 300. Thus, when the first bracket 510 is installed on the side surface 112 of the outer case 110, it may be installed in the second foaming space 922 and third foaming space 923. In other words, a part in which the first rear panel 141 and the machine room forming portion 300 are coupled to the second outer case flange 1121 needs to be considered. However, this is merely exemplary, and the length of the first member 511 and second member 512 may be smaller than the height of the machine room forming portion 300.

Hereinafter, the first outer case flange 1111 and second outer case flange 1121 will be described in detail with reference to FIG. 7.

The foamed plastics are injected into the foaming spaces 921 to 925 through the inlets 1411 to 1416. The foaming spaces 921 to 925 need to be sealed, and the foamed plastics should not leak during the foam molding. To this end, the second opening 114 of the outer case 110 may be coupled to the first rear panel 141 and machine room forming portion 300 to prevent the leakage of the foamed plastics injected into the foaming spaces 921 to 925.

In this document, sealing may mean not an airtight state but that the foamed plastics do not leak or that the foamed plastics flow into only binding sites between components preassembled to define the foaming spaces without leakage into other parts so that the foamed plastics are not visible to the physical eye after the preassembly unless disassembled.

To prevent the leakage of the foamed plastics, the first rear panel 141 may be coupled to the second outer case flange 1121, and the second outer case flange 1121 may be coupled to the fourth forming portion flange 3244 of the machine room forming portion 300 at the bottom of the first rear panel 141. This coupling may prevent leakage to the second opening 114.

The first outer case flange 1111 may be coupled to the fifth forming portion flange 3255 of the machine room forming portion 300, thereby preventing leakage to the third opening 115.

FIG. 7A shows a cross-section of a second coupling portion 11211 where the first rear panel 141 is coupled to the second outer case flange 1121 after the preassembly and the first bracket 510 coupled by avoiding the second coupling portion 11211. As described above, since the first member 511 and second member 512 have the same length, the first member 511 and second member 512 may be installed on any one of the two side surfaces 112 of the outer case 110. Since the length of the first member 511 and second member 512 is greater than the height of the machine room forming portion 300, the first member 511 and second member 512 may partially overlap with the first rear panel 141.

The second outer case flange 1121, which extends from one side surface 112 of the outer case 110 to the other side surface, is recessed toward the first opening 113 so that the second coupling portion 11211 is defined. A flange that bends on two sides surfaces of the first rear panel 141 may be inserted into the second outer case flange 1121 so that the second coupling portion 11211 may be fixed. The embodiment illustrates that the bending flange of the first rear panel 141 has a protrusion and the protrusion is inserted into the second coupling portion 11211 so that the flange is book-coupled to the second coupling portion 11211. The reason for this is to facilitate the preassembly. However, the present disclosure is not limited thereto. That is, other coupling methods may be used if they are capable of preventing the leakage of the foamed plastics.

The first bending surface 513 of the first bracket 510 may be coupled to one side surface 112 of the outer case 110, and the fourth bending surface 516 may form the second coupling portion 11211 and then be coupled to the second outer case flange 1121. Specifically, the second outer case flange 1121 forms the second coupling portion 11211, and then a part further extending towards the other side surface is coupled to the fourth bending surface 516. The second coupling portion 11211 may not be interfered by an avoidance space formed by the second bending surface 514 and third bending surface 515. Since the second coupling portion may be provided in each of the second outer case flanges 1121 provided on the two side surfaces, the second bracket 520 may also be assembled in a similar way.

FIG. 7B shows a cross-section of the second coupling portion 11211 where the fourth forming portion flange 3244 of the machine room forming portion 300 is coupled to the second outer case flange 1121 at the bottom of the first rear panel 141 after the preassembly and the first bracket 510 coupled by avoiding the second coupling portion 11211.

As described above, the second outer case flange 1121 that extends from one side surface 112 of the outer case 110 to the other side surface is recessed toward the first opening 113 so that the second coupling portion 11211 is defined. Thus, the second coupling portion extends from an edge in the direction of the second opening 114 on the one side surface 112 of the outer case 110 so that a part thereof is coupled to the first rear panel 141 and the remaining part is coupled to the fourth forming portion flange 3244 of the machine room forming portion 300.

That is, FIG. 7B shows the cross-section where the first bracket 510 is coupled to the fourth forming portion flange 3244 rather than first rear panel 141 at the bottom of the first rear panel 141. The fourth forming portion flange 3244 may bend and extend in an L shape so as to have a protrusion. Thus, the fourth forming portion flange 3244 may be inserted into the second coupling portion 11211 and then hook-coupled to the second coupling portion 11211. The reason for this is to facilitate the preassembly. However, the present disclosure is not limited thereto. That is, other coupling methods may be used if they are capable of preventing the leakage of the foamed plastics.

Each of the first bracket 510, fourth forming portion flange 3244, and second outer case flange 1121 may have a screw hole at a corresponding location. In this case, after the preassembly, the coupling part of each of the first bracket 510, fourth forming portion flange 3244, and second outer case flange 1121 may be fastened by a screw.

Similarly to FIG. 7A, the first bending surface 513 of the first bracket 510 is coupled to one side surface 112 of the outer case 110, and the fourth bending surface 516 forms the second coupling portion 11211 and is then coupled to the second outer case flange 1121. Specifically, the second outer case flange 1121 forms the second coupling portion 11211, and then a part further extending towards the other side surface is coupled to the fourth bending surface 516. The second coupling portion 11211 may not be interfered by an avoidance space formed by the second bending surface 514 and third bending surface 515. Since the second coupling portion 11211 may be provided in each of the second outer case flanges 1121 provided on the two side surfaces, the second bracket 520 may also be assembled in a similar way.

FIG. 7C shows a cross-section of a first coupling portion 11111 of the fifth forming portion flange 3255 and first outer case flange 11111 and the second bracket 520 coupled by avoiding the first coupling portion 11111, viewed in a direction from the second opening 114 to the first opening 113. The first bracket 510 and second bracket 520 may be designed to have the same bending length such that the first bracket 510 and second bracket 520 are capable of being installed on any one of the two sides 112 of the outer case 110. The above design may be advantageous in terms of cost reduction. The second bracket 520 may include a first bending surface 523, a second bending surface 524, a third bending surface 525, and a fourth bending surface 526, which have the same shapes and sizes as those of the above-described first bracket 510.

The fifth forming portion flange 3255 may bend and extend in an L shape so as to have a protrusion. Thus, the fifth forming portion flange 3255 located at the bottom of the machine room forming portion 300 may be inserted into the first coupling portion 11111 and then hook-coupled to the first coupling portion 11111. The reason for this is to facilitate the preassembly. However, the present disclosure is not limited thereto. That is, other coupling methods may be used if they are capable of preventing the leakage of the foamed plastics.

In addition, the third bending surface 525 and fourth bending surface 526 of the second bracket 520 may avoid the first coupling portion 11111. The first coupling portion 11111 may be provided in each first outer case flanges 1111 provided on the two side surfaces, first bracket 510 may also be assembled in a similar way.

Although specific embodiments have been illustrated and described herein, those of ordinary skill in the art appreciate that the specific embodiments may be substituted with any arrangement which are calculated to achieve the same purpose and that the present disclosure has other applications in other environments. It should be understood that the present disclosure is intended to cover any adaptations or variations of the present disclosure. The following claims are in no way intended to limit the scope of the present disclosure to the specific embodiments described herein. Thus, it is clear that all modifications are included in the scope of the appended claims and their equivalents as long as they include the components as claimed in the claims of the present disclosure.

What is claimed is:

1. A laundry treating apparatus, comprising:
    an outer case having a first front opening;
    an inner case provided inside the outer case and defining a space for holding clothes;
    a machine room forming portion located below the inner case and defining a machine room separated from the inner case;
    a foaming space defined between the outer case and the inner case, between the outer case and the machine room forming portion, and between the inner case and the machine room forming portion;
    foamed plastics filling the foaming space; and
    a reinforcing portion located on two side surfaces of the outer case and configured to strengthen the outer case.

2. The laundry treating apparatus of claim 1, wherein the reinforcing portion is an L-shape bracket.

3. The laundry treating apparatus of claim 2, wherein the bracket comprises:

a first member facing toward a top of the outer case from a bottom of the outer case;

a second member facing toward a front of the outer case from a rear of the outer case; and an overlapping portion in which the first and second members overlap and are coupled to each other.

4. The laundry treating apparatus of claim 3, wherein the outer case further comprises a second opening, wherein the laundry treating apparatus further comprises a rear panel coupled to the second opening and defining a rear surface of the outer case, and wherein the rear panel comprises a first rear panel coupled to the second opening and defining a rear surface connected to the inner case, and a second rear panel coupled to the second opening and defining a rear surface connected to the machine room forming portion.

5. The laundry treating apparatus of claim 4, further comprising a base defining a floor of the outer case, wherein the outer case further comprises:

a first outer case flange extending from a bottom of each of the two side surfaces of the outer case to the other side surface;

a first coupling portion coupled to a bottom of the machine room forming portion by a recess of the first outer case flange toward the inner case;

a second outer case flange extending from a rear of each of the two side surfaces of the outer case to the other side surface; and a second coupling portion coupled to the machine room forming portion by a recess of the second outer case flange toward the first opening, and wherein the bracket has a shape formed by bending of a bar two times in a width direction, and an avoidance space for avoiding interference with the first coupling portion and the second coupling portion is formed when the bracket is installed.

6. The laundry treating apparatus of claim 5, wherein the bar bends in a length direction such that a length (L1) of the first member is equal to a length (L2) of the second member, so that the bracket is provided to be coupled to any one of both side surfaces of the outer case.

7. The laundry treating apparatus of claim 6, wherein the bracket comprises:

a first bracket located at a bottom of one side surface of the outer case; and a second bracket located at a bottom of the other side surface of the outer case.

8. The laundry treating apparatus of claim 5, wherein when the bar bends three times in the width direction, the bracket comprises:

a first bending surface coupled to the side surface of the outer case;

a second bending surface and a third bending surface defining the avoidance space; and a fourth bending surface coupled to the first outer case flange or the second outer case flange, wherein a width (W1) of the first bending surface is greater than a width (W4) of the fourth bending surface.

9. The laundry treating apparatus of claim 5, wherein a length (LB1) of a first bending surface of the bracket is greater than a length (LB2) of a fourth bending surface of the bracket.

10. The laundry treating apparatus of claim 5, wherein when the bar bends in a length direction, caulking is applied the overlapping portion in which the first and second members overlap with each other.

11. The laundry treating apparatus of claim 1, wherein the reinforcing portion is located within the foaming space.

12. The laundry treating apparatus of claim 1, wherein the foamed plastics are any one of polyurethane, polystyrene, and polyolefin.

* * * * *